(12) United States Patent
Mather et al.

(10) Patent No.: US 7,524,914 B2
(45) Date of Patent: *Apr. 28, 2009

(54) SHAPE MEMORY POLYMERS BASED ON SEMICRYSTALLINE THERMOPLASTIC POLYURETHANES BEARING NANOSTRUCTURED HARD SEGMENTS

(75) Inventors: Patrick T. Mather, Chagrin Falls, OH (US); Changdeng Liu, Storrs, CT (US); Qing Ge, Coventry, CT (US)

(73) Assignee: The University of Connecticut, Farmington, CT (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/111,388

(22) Filed: Apr. 21, 2005

(65) Prior Publication Data

US 2005/0245719 A1 Nov. 3, 2005

Related U.S. Application Data

(63) Continuation-in-part of application No. 10/683,167, filed on Oct. 10, 2003, now Pat. No. 7,091,297.

(60) Provisional application No. 60/418,023, filed on Oct. 11, 2002, provisional application No. 60/466,401, filed on Apr. 29, 2003, provisional application No. 60/419,506, filed on Oct. 18, 2002, provisional application No. 60/488,590, filed on Jul. 18, 2003, provisional application No. 60/488,323, filed on Jul. 18, 2003.

(51) Int. Cl.
C08G 18/32 (2006.01)
C08G 18/38 (2006.01)
C08G 18/42 (2006.01)
C08G 18/48 (2006.01)
C08G 18/62 (2006.01)

(52) U.S. Cl. .............................. 528/28; 528/73; 528/74

(58) Field of Classification Search .................... 528/28, 528/73, 74
See application file for complete search history.

(56) References Cited

U.S. PATENT DOCUMENTS

| | | | |
|---|---|---|---|
| 3,383,336 A | 5/1968 | Kuyama et al. |
| 3,459,725 A | 8/1969 | Natta et al. |
| 3,563,973 A | 2/1971 | Arditti et al. |
| 4,612,241 A | 9/1986 | Howard, Jr. |
| 5,145,935 A | 9/1992 | Hayashi |
| 5,147,385 A | 9/1992 | Beck et al. |
| 5,163,952 A | 11/1992 | Froix |
| 5,189,110 A | 2/1993 | Ikematu et al. |
| 5,258,020 A | 11/1993 | Froix |
| 5,282,854 A | 2/1994 | Yagi et al. |
| 5,395,882 A | 3/1995 | Siol et al. |
| 5,506,300 A | 4/1996 | Ward et al. |
| 5,607,467 A | 3/1997 | Froix |
| 5,665,822 A | 9/1997 | Bitler et al. |
| 5,674,242 A | 10/1997 | Phan et al. |
| 5,769,883 A | 6/1998 | Buscemi et al. |
| 5,880,240 A | 3/1999 | Tsuno |
| 5,889,118 A | 3/1999 | Delgado et al. |
| 5,900,444 A | 5/1999 | Zamore |
| 5,908,918 A | 6/1999 | Chen et al. |
| 5,910,357 A | 6/1999 | Hachisuka et al. |
| 5,954,744 A | 9/1999 | Phan et al. |
| 5,955,559 A | 9/1999 | Handlin, Jr. et al. |
| 5,964,744 A | 10/1999 | Balbierz et al. |
| 6,024,764 A | 2/2000 | Schroeppel |
| 6,086,204 A | 7/2000 | Magnante |
| 6,156,842 A | 12/2000 | Hoenig et al. |
| 6,160,084 A | 12/2000 | Langer et al. |
| 6,183,248 B1 | 2/2001 | Chishti et al. |
| 6,217,609 B1 | 4/2001 | Haverkost |
| 6,248,129 B1 | 6/2001 | Froix |
| 6,368,346 B1 | 4/2002 | Jadhav |
| 6,388,043 B1 | 5/2002 | Langer et al. |
| 6,390,812 B1 | 5/2002 | Chishti et al. |
| 6,395,038 B1 | 5/2002 | Schroeppel |
| 6,485,298 B2 | 11/2002 | Chishti et al. |
| 6,530,950 B1 | 3/2003 | Alvarado et al. |
| 6,538,089 B1 | 3/2003 | Samra et al. |
| 6,596,818 B1 | 7/2003 | Zamore |
| 6,679,605 B2 | 1/2004 | Zhou et al. |
| 6,705,861 B2 | 3/2004 | Chishti et al. |
| 6,720,402 B2 | 4/2004 | Langer et al. |

(Continued)

FOREIGN PATENT DOCUMENTS

EP 0 343 442 5/1989

(Continued)

OTHER PUBLICATIONS

JP 02255830 Abstract Only; Oct. 16, 1990 (1 page).

(Continued)

*Primary Examiner*—Rabon Sergent
(74) *Attorney, Agent, or Firm*—Cantor Colburn LLP (57) ABSTRACT

Thermoplastic polyurethanes having an alternating sequence of hard and soft segments in which a nanostructured polyhedral oligosilsesquioxane diol is used as a chain extender to form a crystalline hard segment constituting SMPs. The polyurethanes are formed by reacting a polyol, a chain extender dihydroxyl-terminated polyhedral oligosilsesquioxane and a diisocyanate. The polyurethanes have multiple applications including for example, implants for human health care, drug delivery matrices, superabsorbant hydrogels, coatings, adhesives, temperature and moisture sensors, etc.

20 Claims, 6 Drawing Sheets

U.S. PATENT DOCUMENTS

| | | | |
|---|---|---|---|
| 6,852,825 | B2 | 2/2005 | Lendlein et al. |
| 6,858,680 | B2 | 2/2005 | Gunatillake et al. |
| 7,067,606 | B2 * | 6/2006 | Mather et al. .......... 528/37 |
| 7,091,297 | B2 * | 8/2006 | Mather et al. .......... 528/28 |
| 7,198,639 | B2 * | 4/2007 | Lai et al. .......... 623/6.11 |
| 2002/0007222 | A1 | 1/2002 | Desai |
| 2002/0015519 | A1 | 2/2002 | Tokas et al. |
| 2002/0137864 | A1 | 9/2002 | Tong |
| 2003/0060530 | A1 | 3/2003 | Topolkaraev et al. |
| 2003/0060793 | A1 | 3/2003 | Topolkaraev et al. |
| 2003/0147046 | A1 | 8/2003 | Shadduck |
| 2003/0191276 | A1 | 10/2003 | Lendlein et al. |
| 2004/0014929 | A1 | 1/2004 | Lendlein et al. |
| 2004/0015187 | A1 | 1/2004 | Lendlein et al. |
| 2004/0015261 | A1 | 1/2004 | Hofmann et al. |
| 2004/0024098 | A1 | 2/2004 | Mather et al. |
| 2004/0024143 | A1 | 2/2004 | Lendlein et al. |
| 2004/0030062 | A1 | 2/2004 | Mather et al. |
| 2004/0122174 | A1 | 6/2004 | Mather et al. |
| 2004/0122184 | A1 | 6/2004 | Mather et al. |
| 2005/0010275 | A1 | 1/2005 | Sahatjian et al. |
| 2005/0216074 | A1 | 9/2005 | Sahatjian et al. |
| 2006/0041089 | A1 | 2/2006 | Mather et al. |
| 2007/0290167 | A1 | 12/2007 | Mather et al. |

FOREIGN PATENT DOCUMENTS

| | | |
|---|---|---|
| EP | 0 368 274 | 11/1989 |
| EP | 0 385 443 | 2/1990 |
| EP | 0 422 693 | 2/1991 |
| EP | 1 000 958 | 11/1998 |
| JP | 2005102953 | 4/2005 |
| WO | WO 94/14890 | 7/1994 |
| WO | WO 95/26762 | 10/1995 |
| WO | WO 99/42147 | 8/1999 |
| WO | WO 99/42548 | 8/1999 |
| WO | WO 99/46327 | 9/1999 |
| WO | WO 00/10485 | 3/2000 |
| WO | WO0032131 A1 | 6/2000 |
| WO | WO 00/71554 | 11/2000 |
| WO | WO 01/07499 | 2/2001 |
| WO | WO 01/10871 | 2/2001 |
| WO | WO 01/91822 | 12/2001 |
| WO | WO 02/39875 | 5/2002 |
| WO | WO 02/059170 | 8/2002 |
| WO | WO 02/083786 | 10/2002 |
| WO | WO 03/035743 | 5/2003 |
| WO | WO 03/084490 | 10/2003 |
| WO | WO 03/084491 | 10/2003 |
| WO | WO 03/088818 | 10/2003 |
| WO | WO 03/093341 | 11/2003 |
| WO | WO 2004/006885 | 1/2004 |
| WO | WO 2004/011525 | 2/2004 |
| WO | WO 2004/032799 | 4/2004 |
| WO | WO 2004/033515 | 4/2004 |
| WO | WO 2004/033539 | 4/2004 |
| WO | WO 2004/033553 | 4/2004 |
| WO | WO 2005/009523 | 2/2005 |

OTHER PUBLICATIONS

JP 02274526 Abstract Only; Nov. 8, 1990 (1 page).
JP 11154420 Abstract Only; Jun. 8, 1999 (1 page).
JP 11302493 Abstract Only; Nov. 2, 1999 (1 page).
JP 2232212 Abstract Only; Sep. 14, 1990 (1 page).
JP 2258817 Abstract Only; Oct. 19, 1990 (1 page).
JP 3068610 Abstract Only; Mar. 25, 1991 (1 page).
JP 3068611 Abstract Only; Mar. 25, 1991 (1 page).
JP 4100831 Abstract Only; Apr. 2, 1992 (1 page).
JP 62192440 Abstract Only; Aug. 24, 1987 (1 page).
JP 61231051 Abstract Only; Oct. 15, 1986 (1 page).
JP 63145325 Abstract Only; Jun. 17, 1988 (1 page).
JP 63179955 Abstract Only; Jul. 23, 1988 (1 page).
JP 8301952 Abstract Only; Nov. 19, 1996 (1 page).
JP 9235329 Abstract Only; Sep. 9, 1997 (1 page).
JP 2000319423 Abstract Only; Nov. 21, 2000 (1 page).
Liu, et al., "Chemically Cross-Linked Polycylooctene: Synthesis, Characterization and Shape Memory Behavior" Macromolecules, (2002), 35, pp. 9868-9874.
Dinger, et al., "High Turnover Numbers with Ruthenium-Based Metathesis Catalysts" Advanced Synthesis Catalysis, vol. 344 (2002) pp. 671-677.
Oh et al., "Dynamic Mechanical Properties of Carbon Black Filled Trans-polyoctenamer Vulcanizates" (Oct. 19, 1985) Abstract Only, 1 page.
Lendlein et al., Biodegradable, Elastic Shape-Memory Polymers for Potential Biomedical Applications, Science (2002) 296, pp. 1673-1676.
Nakayama, K., "Properties and Applications of Shape-Memory Polymers", International Polymer Science and Technology 1991, 18, T/43-48.
Irie, M., Shape Memory Polymers, Cambridge University Press: Cambridge, UK 1998, pp. 203-219.
Boochathum et al., Vulcanization of Cis- and Trans-Polyisoprene and Their Blends: Crystallization Characteristics and Properties, European Polymer Journal, 37 (2001) pp. 429-434.
Boochathum et al., "Vulcanization of Cis- and Trans-Polyisoprene and Their Blends: Cure Characteristics and Crosslink Distribution", European Polymer Journal 37 (2001) pp. 417-427.
Schwab et al., "Synthesis and Applications of $RuCl_2(=CHR')(PR_3)_2$: The Influence of the Alkylidene Moiety on Metathesis Activity", J. Am. Chem. Soc. (1996) 118, pp. 100-110.
Bielawski et al., "Highly Efficient Ring-Opening Metathesis Polymerization (ROMP) Using New Ruthenium Catalysts Containing N-Heterocyclic Carbene Ligands", Angew. Chem. Int. Ed. (2000) 39, No. 16, pp. 2903-2906.
Calderon et al., "Melting Temperature of trans-Polyoctenamer", Journal of Polymer Science: Part A-2, vol. 5, (1967), pp. 1283-1292.
Natta et al., "The Monoclinic Structure of Even trans-Polyalkenamers", European Polymer Journal, vol. 3 (1967) pp. 339-352.
Bassi et al., "The Triclinic Structure of trans-Polyoctenamer", European Polymer Journal, vol. 4, (1968), pp. 123-132.
Schneider et al., "Crystallinity of trans-Polyoctenamer: Characterization and Influence of Sample History", Journal of Molecular Catalysis, 46 (1988), pp. 395-403.
Yeh et al., "Radiation-Induced Crosslinking: Effect on Structure of Polyethylene", Colloid & Polymer Sci. 263 (1985), pp. 109-115.
Fu et al., "Nanoscale Reinforcement of Polyhedral Oligomeric Silsesquioxane (POSS) in Polyurethane Elastomer", Polymer Int. 49 (2000) pp. 437-440.
Qing Ge and Patrick T. Mather, "Synthesis of Thermoplastic Polyurethanes Bearing Nanostructured Hard Segments: New Shape Memory Polymers" Polymer Program, Institute of Materials Science and Department of Engineering, UCONN, (Jul. 2003), (Abstract, 2 pages).
Fu et al., "Structural Development During Deformation of Polyurethane Containing Polyhedral Oligomeric Silsesquioxanes (POSS) Molecules", Polymer 42 (2001) pp. 599-611.
Du Prez, F. E. et al., "Segmented Networks by Cationic Polymerization: Design and Applications" NATO Sci. Ser., Ser. E, (1999), pp. 75-98.
Goethals et al. "Poly(Vinyl Ethers) as Building Blocks for New Materials" Macromol. Symp., (1998), 132, pp. 57-64.
Kagami et al., "Shape Memory Behaviors of Crosslinked Copolymers Containing Stearyl Acrylate" Macromol. Rapid. Commun., (1996), 17(8), pp. 539-543.
Kaneko et al., "Shape Memory Gels with Multi-Stimuli-Responses", Proc. SPIE-Int. Soc. Opt. Eng., (1999) 3669, pp. 199-208.
Reyntjens et al., "Polymer Networks Containing Crystallizable Poly(octadecyl vinyl ether) Segments for Shape-Memory Materials", Macromol. Rapid. Commun., (1999), 20(5), pp. 251-255.
H. G. Jeon et al., "Shape Memory and Nanostructure in Poly(norbornyl-POSS) Copolymers", Polymer International, 49, (2000), pp. 453-457.

P. T. Mather et al., "Strain Recovery in Drawn POSS Hybrid Thermoplastics," XIIIth International Congress on Rheology, Cambridge, UK (2000), 4, pp. 53-55.

P. T. Mather et al., "Strain Recovery in POSS Hybrid Thermoplastics," Polymer Preprints 41(1), (2000), pp. 528-529.

Lendlein et al., "AB-Polymer Networks Based on Oligo(ϵ-caprolactone) Segments Showing Shape-Memory Properties" Proc. Natl. Acad. Sci., USA (2001), 98(3), pp. 842-847.

Wei et al., "Shape-Memory Materials and Hybrid Composites for Smart Systems", Journal of Materials Science 33, (1998) pp. 3743-3762.

Van Humbeeck, "Shape Memory Alloys: A Material and a Technology", Advanced Engineering Materials, vol. 3, No. 11, (2001) pp. 837-850.

Byung Kyu Kim et al., "Polyurethane Ionomers Having Shape Memory Effects", Polymer, vol. 39, No. 13 (1998), pp. 2803-2808.

Lin et al., "Study on Shape-Memory Behavior of Polyether-Based Polyurethanes. I. Influence of the Hard-Segment Content", Journal of Applied Polymer Science, vol. 69, (1998), pp. 1563-1574.

Lin et al., "Study on Shape-Memory Behavior of Polyether-Based Polyurethanes. II. Influence of Soft-Segment Molecular Weight", Journal of Applied Polymer Science, vol. 69, (1998), pp. 1575-1586.

Chun et al., "Enhanced Dynamic Mechanical and Shape-Memory Properties of a Poly(ethylene terephthalate)-Poly(ethylene glycol) Copolymer Crosslinked by Maleic Anhydride", Journal of Applied Polymer Science, vol. 83, (2002) pp. 27-37.

Gajria et al., "Miscibility and Biodegradability of Blends of Poly(Lactic Acid) and Poly(Vinyl Acetate)", Polymer, vol. 37, (1996), pp. 437-444.

Ishii, M. "Shape Memory Resins", Trans-polyisoprene-based Shape Memory Resins, Zairyo Gijutsu (1989), 7(6), Abstract Only, 1 page.

Lendlein, Andreas and Steffen Kelch, "Shape-Memory Polymers", Angew. Chem. Int. Ed. 41, (2002), pp. 2034-2057.

Ingrid A. Rousseau and Patrick T. Mather, "Shape Memory Effect Exhibited by Smectic-C Liquid Crystalline Elastomers" J. Am. Chem. Soc., 125, (2003), pp. 15300-15301.

Liu et al., "Shape Memory of Hydrogen-Bonded Polymer Network/Poly(ethylene glycol) Complexes", Chengdu Institute of Organic Chemistry, Chinese Academy of Sciences, Dec. 30, 2003 (5 pages).

Jeong et al., "Miscibility and Shape Memory Property of Poly(vinyl chloride)/Thermoplastic Polyurethane Blends", Journal of Materials Science 36 (2001) 5457-5463.

Jeong et al., "Miscibility and Shape Memory Effect of Thermoplastic Polyurethane Blends with Phenoxy Resin", European Polymer Journal 37 (2001) 2245-2252.

Zhu, G. et al., "Shape-Memory Effects of Radiation Crosslinked Poly(ϵ-caprolactone)", Journal of Applied Polymer Science, vol. 90, 1589-1595 (2003).

Yoshida et al., "Development and Application of Shape-Memory Polymer Gel (Part I)-Synthesis and Processing of Shape-Memory Polymer Gel", Hokkaidoritsu Kogyo Shikenjo Hokoku (1999), 298 Abstract Only, 1 page.

"Silsesquioxanes, Bridging the Gap Between Polymers & Ceramics" ChemFiles vol. 1, No. 6 (2001) (14 pgs).

Ramanathan et al., "Polyurethane Urea", Polymer Data Handbook, New York: Oxford University Press (1999), pp. 878-881.

Ramanathan et al., "Polyurethane Elastomers", Polymer Data Handbook, New York: Oxford University Press (1999), pp. 874-877.

Ramanathan et al., "Polyurethane", Polymer Data Handbook, New York: Oxford University Press (1999), pp. 870-873.

Sung et al., "Properties of Segmented Poly(urethaneureas) Based on 2,4-Toluene Diisocyanate. 1. Thermal Transitions, X-ray Studies, and Comparison with Segmented Poly(urethanes)", Macromolecures, 13, (1980), pp. 111-116.

Gupta et al., "Effect of Solvent Exposure on the Properties of Hydroxy-Terminated Polybutadiene-Based Polyurethanes", Polym Int, 52, (2003), pp. 938-948.

Bielawski et al., "Highly Efficient Syntheses of Acetoxy- and Hydroxy-Terminated Telechelic Poly(butadiene)s Using Ruthenium Catalysts Containing N-heterocyclic Ligands", Polymer, 42, (2001), pp. 4939-4945.

Sarbu et al., "Synthesis of Hydroxy-Telechelic Poly(methyl acrylate) and Polystyrene by Atom Transfer Radical Coupling", Macromolecules, 37, (2004), pp. 9694-9700.

Mauler et al., Liquid-Crystalline Polyacrylate Crosslinked with $\alpha, \omega$ Polyisoprene Diacrylate Segments, Polymer Bulletin, 41, (1998) pp. 291-297.

Sartomer Product Bulletin, "Hydroxyl Terminated Polybutadiene Resins and Derivatives-Poly bd and Krasol" Sep. 2004, 40 pages.

Wache et al., "Development of a Polymer Stent with Shape Memory Effect as a Drug Delivery System", Journal of Materials Science: Materials in Medicine, 14, (2003), pp. 109-112.

Valimaa et al., "Viscoelastic Memory and Self-Expansion of Self-Reinforced Bioabsorbable Stents", Biomaterials, 23, (2002), pp. 3575-3582.

"Suite of Shape-Memory Polymers", Chemical & Engineering, Feb. 5, 2001, 1 page.

Woojin Lee, "Polymer Gel Based Actuator: Dynamic Model of Gel for Real Time Control", Massachusetts Institute of Technology, Department of Mechanical Engineering, May 1996, 120 pages.

Brochure, Degussa High Performance Polymers, The Rubber with Unique Properties, Vestenamer ©, Undated, 12 pages.

Gordon, "Applications of Shape Memory Polyurethanes", Proceedings of the First International Conference on Shape Memory and Superelastic Technologies, SMST International Committee, (1994), pp. 115-199.

Liu et al., "Thermomechanical Characterization of a Novel Series of Shape Memory Polymers", SPE ANTEC Proceedings, (2002) 5 pages.

WO9746633 Abstract Only; Dec. 11, 1997 (1 page).

WO0046262 Abstract Only; Aug. 10, 2000 (1 page).

EP0343442 Abstract Only; Nov. 29, 1989 (1 page).

Schwab et al., "Hybrid Nanoreinforced Polyurethanes Based on Polyhedral Oligomeric Silsesquioxanes (POSS)"; Rapra Abstracts; Pergamon Press Ltd., Oxford, GB, vol. 77, No. 6, Jun. 1999 (Abstract Only) (2 pages).

Schwab et al. Hybrid Nanoreinforced Polyurethanes Based on Polyhedral Oligomeric Silsesquioxanes (POSS), Am. Chem. Soc. PMSE Prep., 1997, 77, pp. 549-550.

J. M. Pachence and J. Kohn in R. P. Lanza, R. Langer, and J. Vacanti, Eds., "Principles of Tissue Engineering, Second Edition", Academic Press, 2000, pp. 269-270.

T. S. Haddad, Patrick T. Mather, Hong G. Jeon, Seung B. Chun, and Shawn H. Phillips, "Hybrid inorganic/Organic Diblock Copolymers. Nanostructure in Polyhedral Oligomeric Silsesquioxane Polynorbornenes," Mat. Res. Soc. Symp. Proc., vol. 628, pp. CC2.6.1-CC2.6.7.

* cited by examiner

DMA plots of the TMP POSS based TPU, with mole ratio of PEG : POSS as 1:6, 1:4 respectively. A transition temperature around 45–47°C was observed. A typical plateau corresponding to physically crosslinked polymers was observed also.

FIG. 1

DSC results of TMP POSS based TPU with different PEG: POSS mole ratio. Two melting peaks can be observed indicating the microphase separation between the soft and hard segment.

FIG.2

Stress-strain experiment of the TMP POSS based
TPU (PEG: POSS=1:6) according to ASTM standard.
A dumbell shaped sample having the
length of the narrow part as 9.42 mm, distance
between grips as 25.5 mm and thickness as
0.355 mm was stretched at room temperature, 1 mm/min.

Sample: polyol = 35500, Polyol:POSS = 1:15

SHAPE MEMORY POLYMERS BASED ON SEMICRYSTALLINE THERMOPLASTIC POLYURETHANES BEARING NANOSTRUCTURED HARD SEGMENTS

CROSS-REFERENCE TO RELATED APPLICATIONS

This application is a continuation-in-part application of U.S. patent application Ser. No. 10/683,167, filed Oct. 10, 2003 and issued Aug. 15,2006 as U.S. Pat. No. 7,091,297 B2, which claims benefit of Provisional Application Nos. 60/418,023 filed Oct. 11, 2002; 60/466,401 filed Apr. 29, 2003; 60/419,506 filed Oct. 18, 2002; 60/488,590 filed Jul. 18, 2003; and 60/488,323 filed Jul. 18, 2003; each of which is incorporated herein by reference in its entirety. Both U.S. patent application Ser. No. 10/425,421 filed Apr. 29, 2003 which claims priority from provisional application No. 60/377,544 and the claimed provisional applications are also incorporated herein by reference.

TECHNICAL FIELD

The instant disclosure relates to shape memory polymers and more particularly thermoplastic polyurethanes with an alternating sequence of hard and soft segments in which a nanostructured polyhedral oligosilsesquioxane diol is used as a chain extender to form a crystalline hard segment and also relates to methods for the preparation of these thermoplastic polyurethanes and to applications thereof.

BACKGROUND OF THE INVENTION

Shape memory materials feature an ability to transform shape from a temporary, frozen, shape to a permanent shape when triggered by an environmental stimulus, such as heat, light, or vapor. Used creatively, these phenomena can be exploited for a wide range of applications. While both shape memory alloys (SMAs) and shape memory polymers (SMPs) show similar thermo-stimulated shape memory properties, their mechanisms of action are quite distinct. Advantages of SMAs include rapid strain recovery (within 1 second), the potential training for two-way reversible memory, and an apparent superelasticity due within the austenite phase at low temperature. In contrast, polymers intrinsically exhibit shape memory effects derived from their highly coiled constituent chains that are collectively extensible via mechanical work and this energy may be stored indefinitely, known as "shape fixing," by cooling below $T_g$ or $T_m$. The polymeric samples can later perform mechanical work and return to a stress-free state when heated above the critical temperature, mobilizing the frozen chains to regain the entropy of their coiled state. In comparison to SMAs, thermally stimulated SMPs have the advantages of: (i) large recoverable deformations in excess of several hundred percent strain; (ii) facile tuning of transition temperatures through variation of the polymer chemistry; and (iii) processing ease at low cost.

Thermally stimulated SMPs with different thermomechanical properties to function in various applications, for example as medical devices and mechanical actuators have previously been synthesized and characterized by the instant inventors. The materials span a range of room temperature moduli, from rigid glassy materials having storage moduli of several GPa to compliant rubbers with moduli as low as tens of MPa. Moreover, the retracting (rubbery) moduli have been adjusted over the range $0.5 < E < 10$ MPa, as prescribed by the end application. One such example is chemically crosslinked polycyclooctene (PCO), a stiff semicrystalline rubber that is elastically deformed above $T_m$ to a temporary shape that is fixed by crystallization. Fast and complete recovery of gross deformations is achieved by immersion in hot water. These SMPs have been described in Provisional Patent Application Ser. No. 60/419,506 filed Oct. 18, 2002 entitled Chemically Crosslinked Polycyclooctene, the entirety of which is incorporated herein by reference. In Provisional Patent Application Ser. No. 60/377,544 filed May 2, 2002 entitled Castable Shape Memory Polymers, the entirety of which is incorporated herein by reference, stiffer SMPs offering tunable critical temperatures and rubber modulus using a thermosetting random copolymer made of two vinyl monomers that yield controlled $T_g$ and casting-type processing are described. Such copolymers were crosslinked with a difunctional vinyl monomer (crosslinker), the concentration of crosslinker controlling the rubber modulus and thus the work potential during recovery. Besides their shape memory effects, these materials are also castable allowing for processing more complex shapes. In addition, they are optically transparent making them useful for additional applications.

The use of chemical crosslinking in both of these cases limits the types of processing possible and forever sets the equilibrium shape at the point of network formation. Therefore, miscible blends of a semicrystalline polymer with amorphous polymers have also been intensively investigated due to their attractive crystalline properties and mechanical properties. For those blends that are miscible at the molecular level, a single glass transition results, without broadening, an aspect important to shape memory. Additionally, in such miscible blends the equilibrium crystallinity (which controls the plateau modulus between $T_g$ and $T_m$ where shape fixing is performed) also changes dramatically and systematically with the blend compositions. It provides a simple route to alternative shape memory plastics; i.e. SMPs with relatively high modulus in the fixed state at room temperature, having a tunable and sharp transition, and the permanent shape can be remolded repeatedly above certain melting temperatures. These SMP blends have been described in Provisional Patent Application Ser. No. 60/466,401 filed Apr. 29, 2003 entitled Blends of Amorphous and Semicrystalline Polymers with Shape Memory Properties, the entirety of which is incorporated herein by reference.

Microphase-separated semicrystalline thermoplastic polymers with two sharp melting transitions $T_{m2} > T_{m1} >$ room temperature, where the difference of the two melting points is at least 20° C., are also good candidates for shape memory offering the advantage of melt processing above $T_{m2}$, and repeated resetting of the equilibrium shape by relaxing stress in the fluid state. Representative past examples of such polymers in this class of SMP are conventional polyurethanes whose soft domains are glassy or semicrystalline with low melting point (but higher than $T_{crit}$) and whose hard domains feature a higher melting point only exceeded during processing.

SUMMARY OF THE INVENTION

It is an object of the present invention to provide shape memory polymers comprising hybrid polyurethanes.

It is another object of the invention to provide shape memory polymers having medium and tunable modulus in the fixed state at room temperature, having a tunable and sharp transition, whose permanent shape can be repeatedly remolded above a certain melting temperature.

It is another object of the invention to provide hybrid polyurethane SMPs evidencing sharp and tunable transition temperatures, adjustable stiffness above their transition temperatures, especially physical properties at 37° C. controlled by the level of POSS content, and thermal processability above the melting point of the POSS domains.

It is yet another object of the invention to provide hybrid polyurethane SMPs which possess excellent shape recovery effect at the recovery temperature and the retracting force is adjustable according to the composition of the POSS.

A further object of the invention is to provide hybrid polyurethanes that are biocompatible and can be used as medical devices and implants.

Still a further object of the invention is to provide hybrid polyurethanes that are biodegradable and whose biodegradation rate can be controlled by the type of polyol, the molecular weight of polyol, and the POSS content.

Still a further object of the invention is to provide hybrid polyurethanes that can be used as a drug delivery vehicle whose elution profile is controlled by the polymer composition; specifically, the chemical structures, the molecular weight, and the weight ratio of the polyol in the polyurethane.

Yet another object of the invention is a method for synthesizing such hybrid polyurethanes.

Broadly the disclosure provides a method for producing hybrid polyurethane SMPs by reacting (A) a polyol, (B) a chain extender dihydroxyl-terminated polyhedral oligosilsesquioxane (dihydroxyl-terminated POSS) and (C) a diisocyanate. As used herein, the term "polyol" is defined as a polymeric diol. The polyol (A) can be a nonbiodegradable one, such as, for example: polyethylene glycol (PEG), polytetrahydrofuran (polyTHF), and diols prepared from polycyclooctene (PCO), trans-1,4 butadiene, or transisoprene; or a biodegradable one, such as, for example: diols prepared from caprolactone (polycaprolactone (PCL) diol), polycaprolactone-polylactide random copolymers, polycaprolactone-polyglycolide random copolymers, polycaprolactone-polylactide-polyglycolide random copolymers, polylactide polyol, polycaprolactone-poly(β-hydroxybutyric acid) random copolymers, or poly(β-hydroxybutyric acid). The diols prepared from caprolactone include, for example, diols obtained from the polymerization of caprolactone initiated with a low molecular weight diol to obtain a polycaprolactone (PCL) diol. Suitable low molecular weight diol initiators include, for example, $C_1$-$C_{10}$ alkyl diols (e.g. propane diol, butane diol, etc.). Hydroxyl-terminated poly(trans-1,4-butadiene), hydroxyl-terminated polycyclooctene (PCO diol), and hydroxyl-terminated poly(trans-1,4-isoprene) can also be prepared by methods known by one of ordinary skill in the art. See, e.g. Polymer 42 (2001) pp. 4939-4945, for the preparation of diols via ring opening metathesis-polymerization chemistry. Eur. Polym. J. (1995) 31:51 and Eur. Polym. J. (1997) 31:339) disclose methods to prepare hydroxyl-terminated poly(isoprene). Sartomer Co. Inc. of Exton Pa. provides several commercially available hydroxyl terminated polybutadienes.

Also contemplated herein are hydroxyl-terminated polymethacrylate copolymer, for example diols of polymethyl methacrylate (PMMA) copolymerized with a Tg-reducing comonomer, including methyl, ethyl, propyl, or butyl (meth)acrylate. The hydroxyl-terminated poly(methyl)methacrylate copolymers can be prepared via controlled radical polymerization methods. An example of the synthesis of hydroxyl-terminated poly(meth)acrylate copolymers can be found in Macromolecules 37 (2004) pp. 9694-9700.

The chain extender dihydroxyl-terminated POSS (B) can be a compound containing a polyhedral oligosilsesquioxane moiety and a diol moiety, wherein a linking group links the two moieties. Commercially available polyhedral oligosilsesquioxane diols include those provided by Hybrid Plastics™ Hattiesburg, Miss. or Aldrich Chemical (see generally "*Silsesquioxanes, Bridging the Gap Between Polymers and Ceramics*", Chemfiles, Vol. 1, No. 6, 2001 (Aldrich Chemical). Exemplary polyhedral oligosilsesquioxane diols include 1-(2,3-propanediol)propoxy-3,5,7,9,11,13,15-isobutylpentacyclo-[9.5.1.1$^{3,9}$.1$^{5,15}$.1$^{7,13}$]octasiloxane ("1,2-propanediolisobutyl-POSS" CAS # 480439-49-4); 1-(2,3-propanediol)propoxy-3,5,7,9,11,13,15-cyclohexylpentacyclo-[9.5.1.1$^{3,9}$.1$^{5,15}$.1$^{7,13}$]octasiloxane ("1,2-propanediolcyclohexyl-POSS"); 2-ethyl-2-[3-[[(heptacyclopentylpentacyclo-[9.5.1.1$^{3,9}$.1$^{5,15}$.1$^{7,13}$] octasiloxanyl)oxy]dimethylsilyl]-propoxy]methyl]-1,3-propanediol ("TMP cyclopentyldiol-POSS" or "TMP Diolcyclopentyl-POSS", CAS 268747-51-9); 2-ethyl-2-[3-[[(heptacyclohexylpentacyclo-[9.5.1.1$^{3,9}$.1$^{5,15}$.1$^{7,13}$]octasiloxanyl)oxy]dimethylsilyl]-propoxy]methyl]-1,3-propanediol ("TMP cyclohexyldiol-POSS"); 2-ethyl-2-[3-[[(heptaisobutylpentacyclo-[9.5.1.1$^{3,9}$.1$^{5,15}$.1$^{7,13}$] octasiloxanyl)oxy]dimethylsilyl]-propoxy]methyl]-1,3-propanediol ("TMP isobutyldiol-POSS" or "TMP diolisobutyl-POSS"); 1-(2-trans-cyclohexanediol)ethyl-3,5,7,9,11,13,15-cyclohexanepentacyclo-[9.5.1.1$^{3,9}$.1$^{5,15}$.1$^{7,13}$] octasiloxane ("trans-cyclohexanediolcyclohexane-POSS" or "trans-cyclohexanediolcyclohexyl-POSS"); 1-(2-trans-cyclohexanediol)ethyl-3,5,7,9,11,13,15-isobutylpentacyclo-[9.5.1.1$^{3,9}$.1$^{5,15}$.1$^{7,13}$]octasiloxane, ("transcyclohexanediolisobutyl-POSS", CAS 480439-48-3); and 2-ethyl-2-[3-[[(heptaisobutylpentacyclo-[9.5.1.1$^{3,9}$.1$^{5,15}$.1$^{7,13}$] octasiloxanyl)oxy]-dimethylsilyl]propoxy]propane-1,3-diol.

The diisocyanate (C) can be selected from a large number of diisocyanates and is preferably 4,4'-diphenyl methylene diisocyanate (MDI). Other diisocyanates (C) that will function well for the synthesis of hybrid polyurethane SMPs include, for example: toluene-2,4-diisocyanate (TDI), toluene-2,6-diisocyanate, hexamethylene-1,6-diisocyanate (HDI), isophorone diisocyanate (IPDI), hydrogenated 4,4'-diphenylmethane diisocyanate (H12MDI), 1,3-bis-isocyanato-1-methylene ethylene benzene, and the like.

The (B) list can be used in conjunction with non-hybrid (conventional) low molecular weight diols. These can be chosen from alkane diols (e.g., 1,3-propanediol, 1,4-butane diol, 1,5-n-pentane diol, 1,6-n-hexane diol, 1,4-trans cyclohexane exodiol, and 1,4-trans cyclohexane endodiol).

The polyol can be semicrystalline and preferably selected from polyethylene glycol (PEG), hydroxyl-terminated polycaprolactone (PCL), hydroxyl-terminated polycyclooctene (PCO), hydroxyl-terminated poly(trans-1,4-butadiene), hydroxyl-terminated poly(transisoprene) or it can be amorphous in which case it can be poly(tetrahydrofuran) diol, polynorbornene diol and/or a hydroxyl-terminated poly(methyl)methacrylate copolymer or homopolymer. As used herein, "semicrystalline" is defined as the physical state where at least a portion of the material is spatially organized into crystalline regions that are characterized by both a distinct crystalline structure and a melting transition, $T_m$, above which the material behaves as a structure-less liquid.

Other suitable diisocyanates (C) include, for example, $C_4$-$C_{30}$ linear or branched alkyl diisocyanates; $C_8$-$C_{30}$ aryl diisocyanates including diisocyanates containing phenyl groups; and the like. Optionally the alkyl or aryl groups can be substituted with one or more substituents chosen from $C_4$-$C_{10}$ tertiary alkyl, $C_1$-$C_{12}$ primary or secondary alkyl, $C_4$-$C_{10}$ tertiary alkoxy, $C_1$-$C_{12}$ primary or secondary alkoxy, halogen, and the like. The mol ratio of polyol: chain extender: diisocyanate can be about 1:2:3; specifically about 1:5:6; and more specifically about 1:10:11. TPUs can be prepared from a ratio of polyol to polyhedral oligosilsesquioxane diol (ratio of x:y) of about 1:2 to about 1:20, specifically about 1:4 to about 1:12, and more specifically about 1:5 to about 1:10. The ratio of polyol to dihydroxyl-terminated POSS affects the shape memory properties of the resulting TPU by determining the flatness of the rubber modulus versus temperature plateau above the $T_m$ or $T_g$ of the polyol segment. In some embodiments, the shape memory polymer comprises a $T_g$ above about 37° C., specifically above about 55° C.

The method of the invention and the novel hybrid polyurethanes prepared thereby are illustrated by the following non-limiting reaction schemes.

Scheme 1.

Scheme 1 shows an example of the synthesis of TPU using polyethylene glycol as polyol (n is a number such that the diol molecular weight is in the range of about 2,000 to about 20,000 g/mol), trans-cyclohexanediol isobutyl-POSS as chain extender to react with 4,4' diphenyl methylene diisocyanate in toluene.

Scheme 2.

Scheme 2 shows an example of the synthesis of TPU using a polycaprolactone diol as polyol (n is a number such that 2*n gives a total PCL diol molecular weight in the range of about 2,000 to about 20,000 g/mol), TMP Isobutyldiol-POSS as chain extender to react with 4,4' diphenyl methylene diisocyanate.

Scheme 3.

Scheme 3 shows an example of the synthesis of TPU using a polycyclooctene diol as polyol (n is chosen such that the diol molecular weight is in the range of about 2,000 to about 20,000 g/mol), TMP Isobutyldiol-POSS as chain extender to react with 4,4' diphenyl methylene diisocyanate.

Scheme 4.

Scheme 4 illustrates an example of the synthesis of polycaprolactone-polylactide random copolymer diol using ring-opening polymerization. The copolymers show one single sharp $T_g$ that can be tunable according to the CL:LA molar ratios. In an exemplary embodiment, D,L-lactide or "meso" lactide (CAS # 96-95-5, 3,6-dimethyl-1,4-dioxane-2,5-dione) is reacted with caprolactone to provide the copolymer.

Scheme 5.

Scheme 5 shows an example of synthesis of TPU using a polycaprolactone -D,L-polylactide random copolymer as polyol, TMP Isobutyldiol-POSS (R is isobutyl) as chain extender to react with 4,4' diphenyl methylene diisocyanate.

A general structure for the POSS-based TPUs incorporating PEG diol and TMP POSS is shown in Scheme 6. The polymers allow systematic variation in the ratio of x/y (1 to 20), the polyol degree of polymerization (1<n<1000), and the total degree of polymerization, 2<m<100.

Scheme 6.

In the foregoing scheme, the R substituent can include a $C_1$-$C_{12}$ primary, secondary, or tertiary alkyl group. Exemplary R groups include methyl, isobutyl, isooctyl, cyclopentyl, cyclohexyl, phenyl, and the like.

The instant hybrid polyurethanes demonstrate sharp and tunable transition temperatures, adjustable stiffness above their transition temperatures, and thermal processability above the melting point of the POSS domains. The hybrid polyurethanes also show excellent shape recovery effect at the recovery temperature and the retracting force is adjustable according to the composition of the POSS. They also posses a umque property that is different from the other shape memory polymers in that the current invention (in the PEG embodiment) can be triggered to recover by moisture (liquid or vapor) aside from heating. For the thermal triggering mechanism, the range 30° C. to 60° C. according to the ratio of the components used and (importantly) thermal annealing to achieve steady-state (equilibrium) crystallinity is important. The recovery can be finished within seconds when heated 20° C. above the transition temperature. The additional advantages of the materials include that the materials are rigid at room temperature, the polymers generally are biocompatible. In some cases, the described TPUs are biodegradable, and the biodegradation rate can be controlled by the chemical compositions, soft segment length, and soft-segment/hard-segment ratios, and can be used as medical devices and implants, as the degradation products are generally non-toxic, non-immunogenic, and absorbable. Biodegradability can be estimated by measuring the percent mass loss after 70 days immersion in a buffered saline solution (0.01 M phosphate, 0.138 M NaCl, 0.027 M KCl). This test is described in detail in the working examples below. Some samples exhibit less than about 85% mass loss in this test, while others exhibit greater than about 85% mass loss. The materials can also be used as drug elution stents or stent coatings. The materials can further be dyed to any color or rendered radio-opaque for x-ray radiography according to application requirements.

Any of the hybrid polyurethane polymers mentioned above may be filled with, for example, nanoparticles of boron nitride, silica, titanium dioxide, montmorillonite, clay, Kevlar, staple, aluminum nitride, barium subcarbonate and bismuth subcarbonate. Clay and silica can be used to, for example, increase the modulus of the plastic. Dispersing agents and/or compatibilizing agents may be used, for example, to improve the blending of polymers and the blending of polymers with fillers. Dispersing agents and/or compatibilizing agents include, for example, ACRAWAX® (ethylene bis-stearamide), polyurethanes and ELVALOY® (acrylic functionalized polyethylene).

In one embodiment, the rate of biodegradation of the thermoplastic polyurethane shape memory polymer can be controlled by adjusting the content of POSS chain extender, the content and composition of the polyol. For example, the biodegradation rate can be a) decreased by increasing the amount of POSS chain extender in the polymer; b) decreased by increasing the molecular weight of the polyol in the polymer; or c) increased by increasing the amount of hydrolysable groups in the polyol.

In another embodiment, a drug eluting implant, a drug eluting stent, or drug eluting stent coating is prepared from a biodegradable shape memory polymer. For example, a thermoplastic polyurethane shape memory polymer can exhibit a certain rate of biodegradation. The rate of drug elution from the polymer correlates to the rate of biodegradation of the shape memory polymer.

DETAILED DESCRIPTION OF THE INVENTION

Thermoplastic polyurethanes with different compositions were synthesized by one-step condensation polymerization using scheme 1 shown above ((A) PEG as the polyol, (B) transcyclohexanediolisobutyl-polyhedral oligosilsesquioxane diol and (C) MDI as the diisocyanate. Toluene was used as solvent and dibutyltin dilaurate was used as catalyst. The reaction was kept at 90° C. under the nitrogen for 2 hours and then cooled down to room temperature and precipitated into hexane. The product was dried thoroughly and dissolved in toluene to make a 10 wt % solution for casting films. The molecular weights and molecular weight distributions of this series of samples obtained from size exclusion chromatography are summarized in Table 1.

TABLE 1

Molecular weights and molecular weight distributions of POSS-based polyurethanes having polyol (PEG) block length of 10000 g/mol

| Sample | $M_n$ (g/mol) | $M_w/M_n$ |
|---|---|---|
| PEG:POSS = 1:3 | 47,400 | 1.42 |
| PEG:POSS = 1:4 | 48,800 | 1.44 |
| PEG:POSS = 1:6 | 54,000 | 1.54 |
| PEG:POSS = 1:8 | 49,200 | 1.30 |

Figure 1:
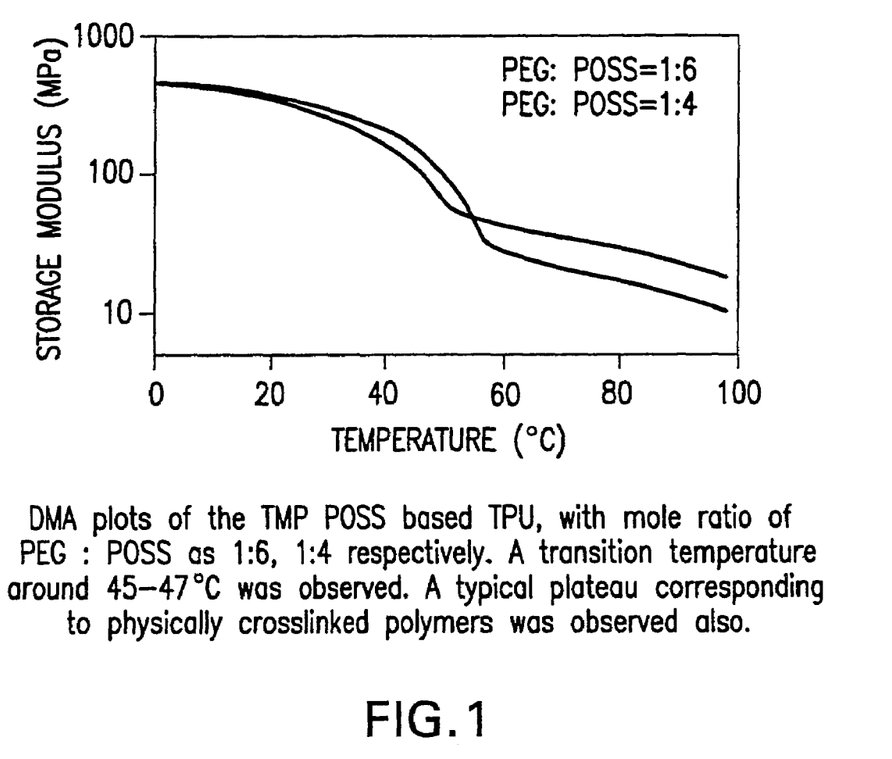
FIG. 1 illustrates graphically the DMA plots of the TMP POSS based thermoplastic polyurethane (TPU) with mole ratio of PEG:POSS as 1:6, 1:4 respectively.
Figure 2:
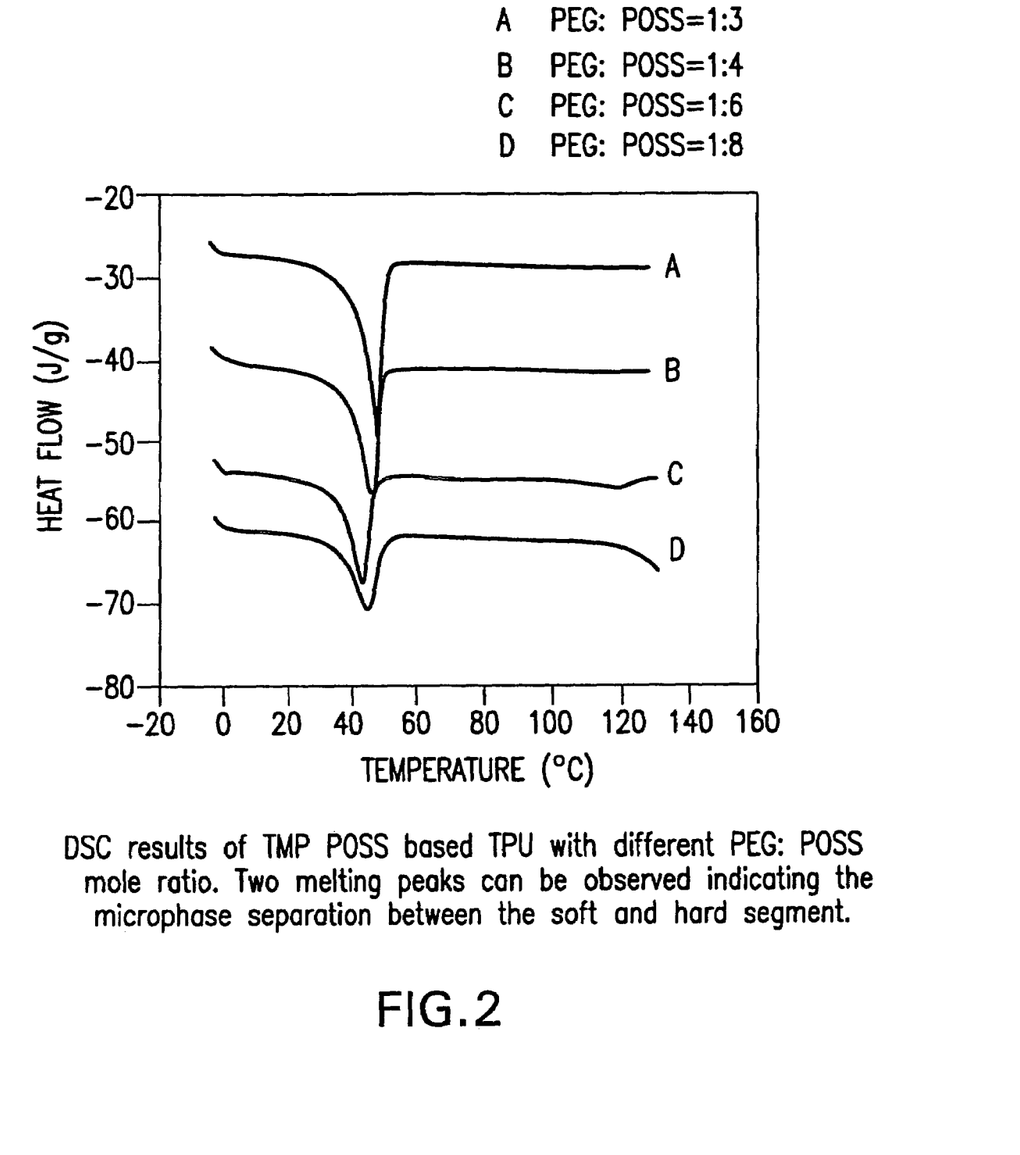
FIG. 2 illustrates graphically the DSC results of TMP POSS based TPU with different PEG:POSS mole ratios.
Figure 3:
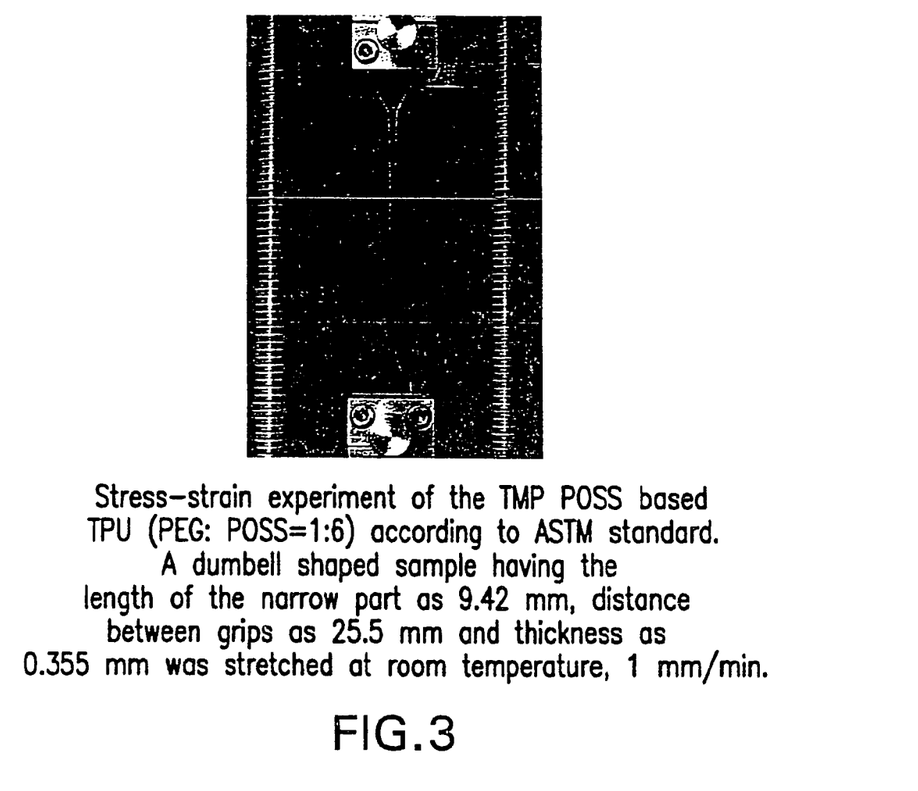
FIG. 3 illustrates visually the response of an example TPU (TMP POSS based TPU (PEG:POSS=1:6)) to a large tensile deformation.
Figure 4:
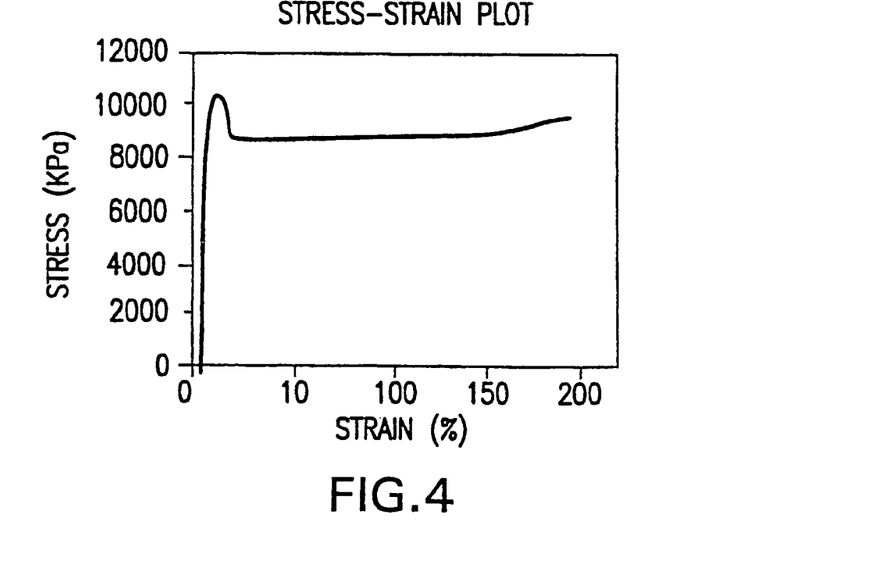
FIG. 4 illustrates graphically the stress-strain plot of the TMP POSS based TPU (PEG:POSS=1:6)

Samples of polyurethanes with different compositions were characterized by differential scanning calorimetry (TA Instruments DSC2920). All of the samples were characterized under the same conditions: two scans were performed for each sample with heating and cooling rates of 10° C./min (FIG. 2). It was observed that this series of polyurethanes exhibit two melting points, one in the range $45<T_{m1}<50°$ C. corresponding to the melting temperature of PEG "soft" block. The other melting transition appears in the range $110<T_{m2}<130°$ C., which corresponds to the melting of a POSS-reinforced hard segment phase. The melting temperature of the soft segment is observed to shift to lower values with a broadening of the melting peak while the melting temperature of the hard segment is observed to shift to higher values with a sharpening of the melting peak when the mole ratio of polyol:chain extender decreases. This result can be explained in that as the PEG:POSS ratio decreases, the resulting block copolymer will have less overall PEG content, which will directly affect the size and perfection of the crystallization of PEG blocks. Therefore, the melting temperature moves to lower values and the peak is broadened. On the contrary, the content of POSS will increase in the block copolymers, which provides for more clear aggregation of hard segments to form larger and more perfect crystals. Therefore, the melting temperature of hard segment moves to higher values while the peak is sharpened (FIG. 2).

The dried films of the formed polyurethanes were cut into thin strips for tests of temporary shape fixing and subsequent recovery, or shape memory. For example, a sample was first heated on the hot stage to 65° C., which is well above the first transition temperature but low enough to avoid melting of the elastic network of the POSS-rich phase. It was then stretched to a certain degree of elongation and cooled down to the room temperature. The deformed shape was fixed at room temperature. Finally, the deformed sample was heated up again on hot plate to 65° C. and it was observed that the sample restored to its original length completely and within seconds. A similar phenomenon was observed when water was used as a stimulus for the shape recovery except that the sample secondarily swelled to form a tough hydrogel.

Biodegradation studies were performed on polyurethanes prepared from poly(ε-caprolactone)-co-poly(D,L-lactide) as the polyol; 1-[2-ethyl-2-[(3-dimethylsiloxy)propoxymethyl]-1,3-propanediol]-3,5,7,9,11,13,15-isobutylpentacyclo-[9.5.1$^{13,9}$.1$^{5,15}$.1$^{7,13}$]-octasiloxane as the dihydroxyl-terminated POSS; and 4,4-methylenebis(phenyl-isocyanate) as the diisocyanate according to the following procedure.

Synthesis of poly(ε-caprolactone)-co-poly(D,L-lactide) (PCL-co-PDLLA) was carried out in bulk. A mixture of ε-caprolactone (99%, Aldrich, used as received), D, L-lactide (99%, Aldrich, purified by recrystallization), 1,4-butane diol (96%, Aldrich, dried using 4 Å molecular sieves) (molar amounts varied) and catalytic stannous octoate were put in a three-neck flask equipped with nitrogen inlet and outlet. Magnetic stirring was used to agitate the reaction mixture. The temperature was set at 140° C. and the polymerization reaction took 4 hours to complete. The product was dissolved in toluene and precipitated into hexane. The sample of PCL-co-PDLLA was dried in vacuum oven overnight.

POSS-based thermoplastic polyurethanes were then synthesized using a one-step polymerization method. A 50 mL three-neck flask equipped with nitrogen inlet and outlet, condenser and thermometer was used as the reactor for the polymerization. Starting with a purging of nitrogen, 1.5 g of PCL-co-PDLLA ($M_n$=10000 g/mol, 1.5×10$^{-4}$ mol) were mixed together with 1 g (9.03×10$^{-4}$ mol) of TMP-DiolIsobutyl-POSS (1-[2-Ethyl-2-[(3-dimethylsiloxy)propoxymethyl]-1,3-propanediol]-3,5,7,9,11,13,15-isobutylpentacyclo-[9.5.1$^{13,9}$.1$^{5,15}$.1$^{7,13}$]-octasiloxane, 95%, Hybrid Plastics, used as received) in 25 mL of toluene (Fisher, ACS Certified, dried over molecular 4 Å sieves). The reactor was heated to 50° C., followed by adding 0.2633 g (1.05×10$^{-3}$ mol) of 4,4-methylenebis(phenyl-isocyanate) (98%, Aldrich, used as received). The reaction mixture was then heated to 90° C. and 2 drops of dibutyltin dilaurate (95%, Aldrich) was added through a syringe. A thickening phenomenon was observed during the reaction and the reaction was kept at 90° C. for 2 hr under the nitrogen atmosphere before completion. Then the thickened polymer solution was precipitated into excess amount of n-hexane, filtered and dried to remove any unreacted POSS. The dried polymer was dissolved in toluene again to make a 10 wt % of solution for casting films. Several series of samples were made using PCL-co-PDLLA as soft segment and the ratio of PCL-co-PDLLA/POSS as variables (See FIG. 5).

Biodegradation test of samples (approximately 150 micrometers thick) with different polyol molecular weight and different polyol:POSS ratio was carried out at 37° C. in Phosphate Buffered Saline (PBS) ((0.01 M); NaCl 0.138 M; KCl 0.0027 M) buffer. The samples were put in the buffer for 92 days and the progress of degradation was measured every 10 days by taking the samples from the buffer and determining the percent mass retained. The data are summarized in FIG. 5.

Figure 5:
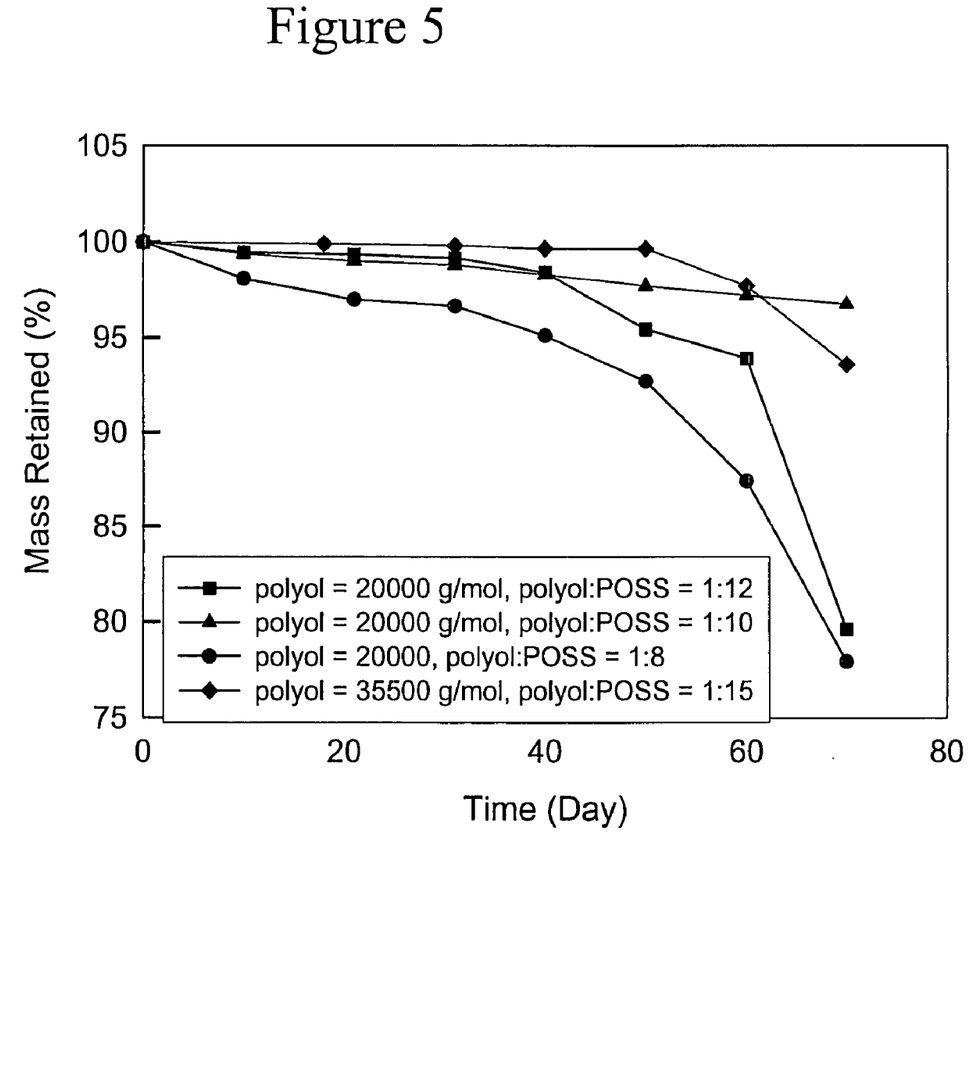
FIG. 5 illustrates graphically the mass loss of TPUs with different soft segment length and soft-segment/hard-segment ratios in phosphate buffered saline.

As illustrated by FIG. 5, it was observed that the degradation was very slow at the first 30 days. The samples having higher molecular weight of soft segment degraded more slowly than the ones having low molecular weight of soft segment. Moreover, with same molecular weight of soft segment, those having higher POSS content degraded more slowly than the ones having lower POSS content. Therefore, it can be speculated that the soft segment is a dominant species at the beginning of the degradation. The degradation progressed by chain scission of the soft segment, particularly hydrolysis of the ester linkages (Schemes 4 and 5). Therefore, the longer the soft segment, the slower the rate of degradation. Moreover, if the weight fraction of the POSS is higher, the same chain scission is suppressed and the rate of degradation will also be decreased.

After the first 30 days, the rate of degradation was accelerated for most of the samples, with those having lower molecular weight of soft segment having a higher rate of degradation. After 50 days of degradation, cracks appeared on the sample surface for those having lower soft segment molecular weight. The cracks continued to grow until the top layer of the surface separated. With continued degradation, this phenomenon was observed for all samples sooner or later. The profile of the mass loss of the samples is shown in FIG. 5.

Figure 6:
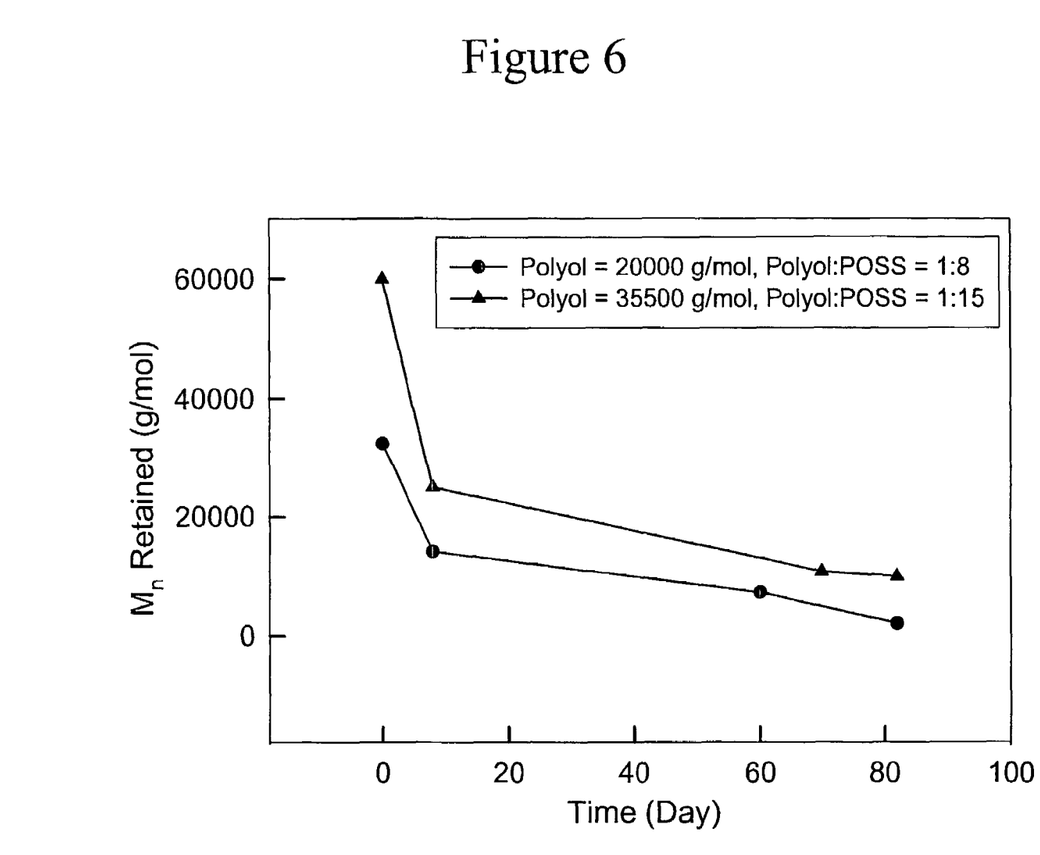
FIG. 6 illustrates graphically the molecular weight decrease of TPUs with different soft segment length and soft-segment/hard-segment ratios in phosphate buffered saline.

Size Exclusion Chromatography (SEC) of samples degraded as above for 0, 8, 60, and 82 days was conducted for SMP polyurethane samples having 20 kDa soft segment, polyol:POSS=1.8 as well as 35.5 kDa soft segment, polyol:POSS=1:15 (See FIG. 6). It was observed that although the mass loss is very slow at the beginning of the degradation, the MW during the same stage decreased very fast further proving that the degradation proceeds by chain scission. After the sudden decrease in MW within the first 8 days, the molecular weight decreased slowly during the remaining time.

Figure 7:
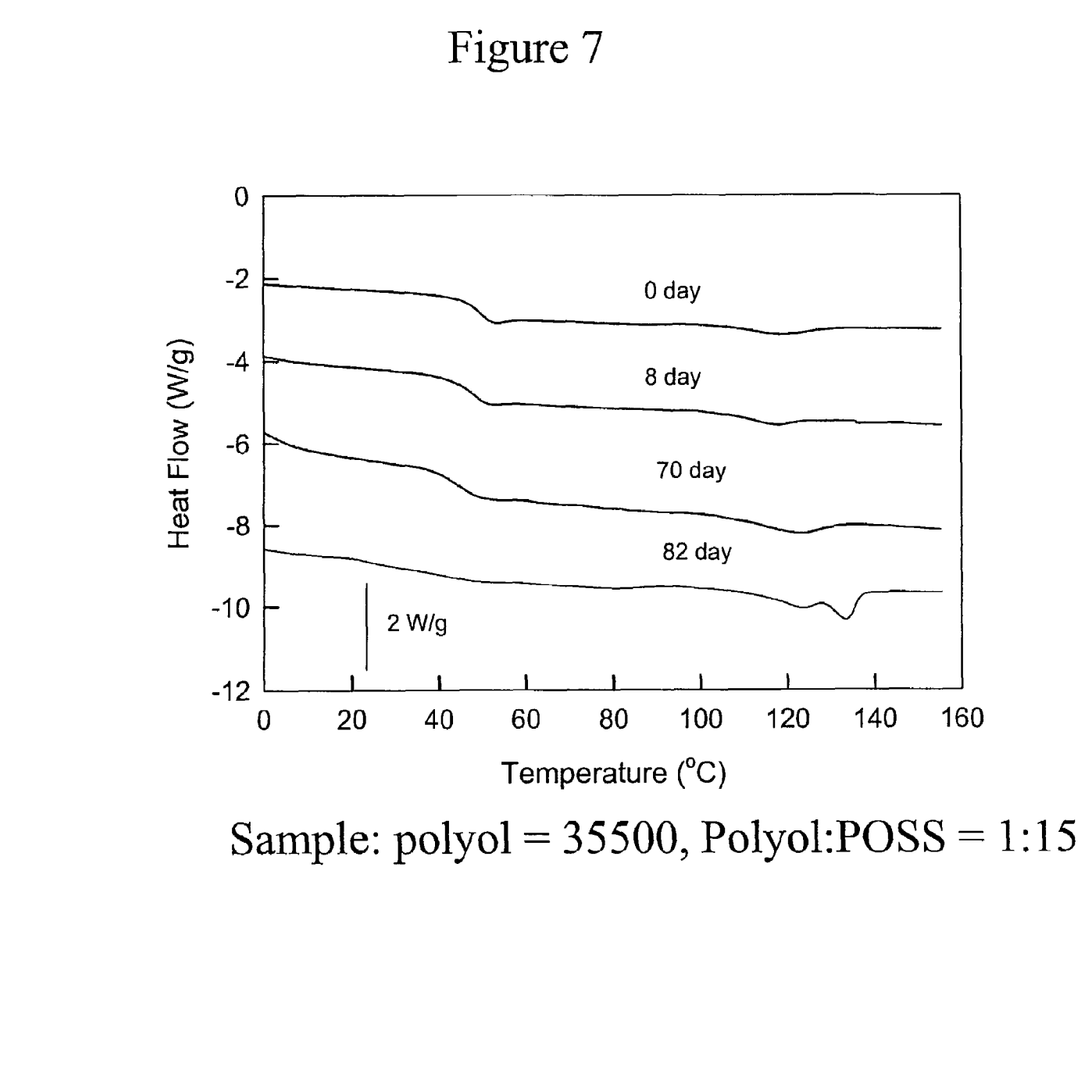
FIG. 7 illustrates graphically the critical temperature change of a TPU in phosphate buffered saline.

Thermal analysis by differential scanning calorimetry (DSC) of selected samples at 0, 8, 60, and 82 days was also conducted (see FIG. 7). All of the samples were first heated to 160° C. at 20° C./min, then cooled down to 70° C. and annealed for 30 min. After annealing, they were cooled down to −20° C. and equilibrated at that temperature and isothermal for 1 min. This preconditioning was conducted in order to achieve a reproducible state comparable between samples. Finally, they were heated to 160° C. again at 20° C./min. and the heat flows were recorded (Seen FIG. 7). It was observed that with ongoing degradation, the $T_g$ of the sample was broadened and the $T_m$ shifted to higher temperature with the appearance of multi-melting peaks.

The hybrid polyurethanes of the invention can be used for the following applications.

a. Stents, patches and other implants for human health care b. Surgical tools requiring adjustable shape but high stiffness.

c. Arbitrarily shape-adjustable structural implements, including personal care items (dinnerware, brushes, etc.) and hardware tool handles.
d. Self healing plastics
e. Medical devices (a dented panel is repaired by heating or plasticizing with solvent)
f. Drug delivery matrices
g. High-strength thermoplastic (non-crosslinked) superabsorbant hydrogels
h. Aqueous Theological modifiers for paints, detergents, and personal care products
i. Impression material for molding, duplication, rapid prototyping, dentistry, and figure-printing.
j. Toys
k. Reversible Embossing for information storage
l. Temperature and moisture sensors
m. Safety valve
n. Heat shrink tapes or seals
o. Heat controlled Couplings and fasteners
p. Large strain, large force actuators
q. Coatings, adhesives
r. Textiles, clothing The shape memory polymers of the disclosure are particularly suitable as biomaterials because of their low thrombogenicity, high biocompatibility, as well as unique mechanical properties. In accordance with the invention the shape memory polyurethanes were formulated such that the melting temperature of one segment falls within a useful temperature range for biomedical application: 37° C.-50° C.

The present disclosure provides an advantageous shape memory polymer that includes thermoplastic polyurethane shape memory polymers formed by reacting in one step a polyol, a POSS chain extender and a diisocyanate, having medium and tunable modulus in the fixed state at room temperature having a tunable sharp transition, whose permanent shape can be repeatedly remolded above a certain melting temperature.

The terms "a" and "an" herein do not denote a limitation of quantity, but rather denote the presence of at least one of the referenced item. All ranges disclosed herein are inclusive and combinable. All cited patents, patent applications, and other references are incorporated herein by reference in their entirety.

Although the polymers and processing methodologies of the present disclosure have been described with reference to specific exemplary embodiments thereof, the present disclosure is not to be limited to such exemplary embodiments. Rather, as will be readily apparent to persons skilled in the art, the teachings of the present disclosure are susceptible to many implementations and/or applications, without departing from either the spirit or the scope of the present disclosure. Indeed, modifications and/or changes in the selection of specific polymers, polymer ratios, processing conditions, and end-use applications are contemplated hereby, and such modifications and/or changes are encompassed within the scope of the present invention as set forth in the claims which follow.

The invention claimed is:

1. A method for making a thermoplastic polyurethane shape memory polymer comprising reacting in one step (A) a polyol, (B) a dihydroxyl-terminated polyhedral oligosilsesquioxane, and (C) a diisocyanate; wherein the polyol is semicrystalline or amorphous and is a member selected from the group consisting of nonbiodegradable polyols, biodegradable polyols, and combinations thereof; and wherein the shape memory polymer exhibits a thermal triggering temperature of 30° C. to 60° C.

2. The method of claim 1, wherein the polyol is a biodegradable polyol selected from the group consisting of hydroxyl-terminated polycaprolactone, hydroxyl-terminated polycaprolactone-polylactide random copolymer, hydroxyl-terminated polycaprolactone-polyglycolide random copolymer, hydroxyl-terminated polycaprolactone-polylactide-polyglycolide random copolymer, hydroxyl-terminated polylactide, hydroxyl-terminated polycaprolactone-poly(β-hydroxybutyric acid) random copolymer, hydroxyl-terminated poly(β-hydroxybutyric acid), and combinations thereof.

3. The method of claim 1, wherein the polyol is a nonbiodegradable polyol selected from the group consisting of polyethylene glycol, hydroxyl-terminated polycyclooctene, hydroxyl-terminated poly(trans-1,4-butadiene), hydroxyl-terminated poly(transisoprene), polynorbornene diol, hydroxyl-terminated polymethacrylate copolymer, and combinations thereof.

4. The method of claim 1, wherein the dihydroxyl-terminated polyhedral oligosilsesquioxane is a member selected from the group consisting of 1-(2,3-propanediol)propoxy-3,5,7,9,11,13,15-isobutylpentacyclo-[9.5.1.1$^{3,9}$.1$^{5,15}$.1$^{7,13}$]octasiloxane; 1-(2,3-propanediol)propoxy-3,5,7,9,11,13,15-cyclohexylpentacyclo-[9.5.1.1$^{3,9}$.1$^{5,15}$.1$^{7,13}$]octasiloxane; 2-ethyl-2-[3-[[(heptacyclopentylpentacyclo-[9.5.1.1$^{3,9}$.1$^{5,}$ $_{15}$.1$^{7,13}$]octasiloxanyl)oxy]dimethylsilyl]-propoxy]methyl]-1,3-propanediol; 2-ethyl-2-[3-[[(heptacyclohexylpentacyclo-[9.5.1.1$^{3,9}$.1$^{5,15}$.1$^{7,13}$]octasiloxanyl)oxy]dimethylsilyl]-propoxy]methyl]-1,3-propanediol; 2-ethyl-2-[3-[[(heptaisobutylpentacyclo-[9.5.1.1$^{3,9}$.1$^{5,15}$.1$^{7,13}$]octasiloxanyl)oxy]dimethylsilyl]-propoxy]methyl]-1,3-propanediol; 1-(2-trans-cyclohexanediol)ethyl-3,5,7,9,11,13,15-cyclohexanepentacyclo-[9.5.1.1$^{3,9}$.1$^{5,15}$.1$^{7,13}$]octasiloxane; 1-(2-trans-cyclohexanediol)ethyl-3,5,7,9,11,13,15-isobutylpentacyclo-[9.5.1.1$^{3,9}$.1$^{5,15}$.1$^{7,13}$]octasiloxane; 2-ethyl-2-[3-[[(heptaisobutylpentacyclo-[9.5.1.1$^{3,9}$.1$^{5,15}$.1$^{7,13}$]octasiloxanyl)oxy]-dimethylsilyl]propoxy]propane-1,3-diol, a combinations thereof.

5. The method of claim 1, wherein the diisocyanate is 4,4'-diphenyl methylene diisocyanate, toluene-2,4-diisocyanate, toluene-2,6-diisocyanate, hexamethylene-1,6-diisocyanate, isophorone diisocyanate, hydrogenated 4,4'-diphenylmethane diisocyanate, and combinations thereof.

6. The method of claim 1, wherein the diisocyanate is 4,4'-diphenyl methylene diisocyanate.

7. The method of claim 1, wherein the polyol is a member selected from the group consisting of polyethylene glycol, hydroxyl-terminated polycyclooctene, hydroxyl-terminated poly(trans-1,4-butadiene), hydroxyl-terminated poly(transisoprene), hydroxyl-terminated polycaprolactone, hydroxyl-terminated polycaprolactone-polylactide random copolymer, hydroxyl-terminated polycaprolactone-polyglycolide random copolymer, hydroxyl-terminated polycaprolactone-polylactide-polyglycolide random copolymer, hydroxyl-terminated polylactide, hydroxyl-terminated polycaprolactone-poly(β-hydroxybutyric acid) random copolymer, hydroxyl-terminated poly(β-hydroxybutyric acid), and combinations thereof; the dihydroxyl-terminated polyhedral oligosilsesquioxane is a member selected from the group consisting of 1-(2,3-propanediol)propoxy-3,5,7,9,11,13,15-isobutylpentacyclo-[9.5.1.1$^{3,9}$.1$^{5,15}$.1$^{7,13}$]octasiloxane; 1-(2,3-propanediol)propoxy-3,5,7,9,11,13,15-cyclohexylpentacyclo-[9.5.1.1$^{3,9}$.1$^{5,15}$.1$^{7,13}$]octasiloxane; 2-ethyl-2-[3-[[(heptacyclopentylpentacyclo-[9.5.1.1$^{3,9}$.1$^{5,15}$.1$^{7,13}$]octasiloxanyl)oxy]dimethylsilyl]-propoxy]methyl]-1,3-propanediol; 2-ethyl-2-[3-[[(heptacyclohexylpentacyclo-[9.5.1.1$^{3,9}$.1$^{5,15}$.1$^{7,13}$]octasiloxanyl)oxy]dimethylsilyl]- propoxy]methyl]-1,3-propanediol; 2-ethyl-2-[3-[[(heptaisobutylpentacyclo-[9.5.1.1$^{3,9}$.1$^{5,15}$.1$^{7,13}$]octasiloxanyl)oxy]dimethylsilyl]-propoxy]methyl]-1,3-propanediol; 1-(2-trans-cyclohexanediol)ethyl-3,5,7,9,11,13,15-cyclohexanepentacyclo-[9.5.1.1$^{3,9}$.1$^{5,15}$.1$^{7,13}$]octasiloxane; 1-(2-trans-cyclohexanediol)ethyl-3,5,7,9,11,13,15-isobutylpentacyclo-[9.5.1.1$^{3,9}$.1$^{5,15}$.1$^{7,13}$]octasiloxane; and 2-ethyl-2-[3-[[(heptaisobutylpentacyclo-[9.5.1.1$^{3,9}$.1$^{5,15}$.1$^{7,13}$]octasiloxanyl)oxy]-dimethylsilyl]propoxy]propane-1,3-diol; and the diisocyanate is 4,4'-diphenyl methylene diisocyanate.

8. A thermoplastic polyurethane shape memory polymer that is biocompatible, biodegradable, or biocompatible and biodegradable; wherein the thermoplastic polyurethane shape memory polymer comprises the reaction product of (A) a polyol, (B) a dihydroxyl-terminated polyhedral oligosilsesquioxane, and (C) a diisocyanate; wherein the polyol is semicrystalline or amorphous and is a member selected from the group consisting of nonbiodegradable polyols, biodegradable polyols, and combinations thereof and wherein the shape memory polymer exhibits a thermal triggering temperature of 30° C. to 60° C.

9. The thermoplastic polyurethane shape memory polymer of claim 8, wherein the polyol is a biodegradable polyol selected from the group consisting of hydroxyl-terminated polycaprolactone, hydroxyl-terminated polycaprolactone-polylactide random copolymer, hydroxyl-terminated polycaprolactone-polyglycolide random copolymer, hydroxyl-terminated polycaprolactone-polylactide-polyglycolide random copolymer, hydroxyl-terminated polylactide, hydroxyl-terminated polycaprolactone-poly(β-hydroxybutyric acid) random copolymer, hydroxyl-terminated poly(β-hydroxybutyric acid), and combinations thereof.

10. The thermoplastic polyurethane shape memory polymer of claim 8, wherein the dihydroxyl-terminated polyhedral oligosilsesquioxane is a member selected from the group consisting of 1-(2,3-propanediol)propoxy-3,5,7,9,11,13,15-isobutylpentacyclo-[9.5.1.1$^{3,9}$.1$^{5,15}$.1$^{7,13}$]octasiloxane; 1-(2,3-propanediol)propoxy-3,5,7,9,11,13,15-cyclohexylpentacyclo-[9.5.1.1$^{3,9}$.1$^{5,15}$.1$^{7,13}$]octasiloxane; 2-ethyl-2-[3-[[(heptacyclopentylpentacyclo-[9.5.1.1$^{3,9}$.1$^{5,15}$.1$^{7,13}$]octasiloxanyl)oxy]dimethylsilyl]-propoxy]methyl]-1,3-propanediol; 2-ethyl-2-[3-[[(heptacyclohexylpentacyclo-[9.5.1.1$^{3,9}$.1$^{5,15}$.1$^{7,13}$]octasiloxanyl)oxy]dimethylsilyl]-propoxy]methyl]-1,3-propanediol; 2-ethyl-2-[3-[[(heptaisobutylpentacyclo-[9.5.1.1$^{3,9}$.1$^{5,15}$.1$^{7,13}$]octasiloxanyl)oxy]dimethylsilyl]-propoxy]methyl]-1,3-propanediol; 1-(2-trans-cyclohexanediol)ethyl-3,5,7,9,11,13,15-cyclohexanepentacyclo-[9.5.1.1$^{3,9}$.1$^{5,15}$.1$^{7,13}$]octasiloxane; 1-(2-trans-cyclohexanediol)ethyl-3,5,7,9,11,13,15-isobutylpentacyclo-[9.5.1.1$^{3,9}$.1$^{5,15}$.1$^{7,13}$]octasiloxane; 2-ethyl-2-[3-[[(heptaisobutylpentacyclo-[9.5.1.1$^{3,9}$.1$^{5,15}$.1$^{7,13}$]octasiloxanyl)oxy]-dimethylsilyl]propoxy]propane-1,3-diol; and combinations thereof.

11. The thermoplastic polyurethane shape memory polymer of claim 8, wherein the diisocyanate is 4,4'-diphenyl methylene diisocyanate, toluene-2,4-diisocyanate, toluene-2,6-diisocyanate, hexamethylene-1,6-diisocyanate, isophorone diisocyanate, hydrogenated 4,4'-diphenylmethane diisocyanate, and combinations thereof.

12. The thermoplastic polyurethane shape memory polymer of claim 8, wherein the ratio of polyol to dihydroxyl-terminated polyhedral oligosilsesquioxane is about 1:3 to about 1:20.

13. The thermoplastic polyurethane shape memory polymer of claim 8, wherein the ratio of polyol to dihydroxyl-terminated polyhedral oligosilsesquioxane is about 1:5.

14. The thermoplastic polyurethane shape memory polymer of claim 8, comprising a $T_g$ above about 37° C.

15. The thermoplastic polyurethane shape memory polymer of claim 8, comprising a $T_g$ above about 55° C.

16. The thermoplastic polyurethane shape memory polymer of claim 8, wherein the polymer retains less than about 85% of its original mass after immersion in a phosphate buffered saline solution ((0.01 M), NaCl (0.138 M), KCl (0.0027 M)) for 70 days.

17. The thermoplastic polyurethane shape memory polymer of claim 8, wherein the polymer retains greater than about 85% of its original mass after immersion in a phosphate buffered saline solution ((0.01 M), NaCl (0.138 M), KCl (0.0027 M)) for 70 days.

18. The thermoplastic polyurethane shape memory polymer of claim 8, comprising a biodegradation rate, wherein the biodegradation rate is
   a) decreased by increasing the amount of dihydroxyl-terminated polyhedral oligosilsesquioxane in the polymer;
   b) decreased by increasing the molecular weight of the polyol in the polymer; or
   c) increased by increasing the amount of hydrolysable groups in the polyol.

19. The thermoplastic polyurethane shape memory polymer of claim 8, wherein the polyol is a hydroxyl-terminated polylactide, and wherein the mole ratio of polyol to dihydroxyl-terminated polyhedral oligosilsesquioxane is about 1:2 to about 1:10.

20. The thermoplastic polyurethane shape memory polymer of claim 8, wherein the polyol is a hydroxyl-terminated polycaprolactone-polylactide random copolymer, and wherein the mole ratio of polyol to dihydroxyl-terminated polyhedral oligosilsesquioxane is about 1:2 to about 1:10.

\* \* \* \* \*